Dec. 30, 1969   N. D. JENSEN   3,487,432
COUPLING ELEMENT FOR CONNECTION BETWEEN A CENTRIFUGAL PUMP
AND ITS DRIVE MOTOR
Filed March 8, 1968

United States Patent Office 3,487,432
Patented Dec. 30, 1969

3,487,432
COUPLING ELEMENT FOR CONNECTION BETWEEN A CENTRIFUGAL PUMP AND ITS DRIVE MOTOR
Niels Due Jensen, Aarhus, Denmark, assignor to Grundfos A/S, Bjerringbro, Denmark
Filed Mar. 8, 1968, Ser. No. 711,633
Claims priority, application Denmark, Mar. 9, 1967, 1,252/67
Int. Cl. F04d *13/08, 17/08*
U.S. Cl. 103—111                                  4 Claims

ABSTRACT OF THE DISCLOSURE

The invention relates to a coupling element with a filter casing for arrangement between a submerged centrifugal pump and its driving motor. The said coupling element serves as a mounting means for the motor and the assembly bands of the pump cylinder and further as coupling between the motor and the pump and as an inlet and filter for the pump liquid. The coupling element is of sheet material, preferably stainless steel, and made exclusively by punching and drawing so that it can be readily manufactured of anti-corrosive material at low cost. The filter is mounted as a separate body inside the coupling element, whereas the reinforcing element is constituted by an outer shell, by which substantial strength in proportion to the weight is obtained.

BACKGROUND OF THE INVENTION

Coupling elements of the above type have hitherto been made with a core of cruciform cross-section produced by casting, a disc-shaped member, to which the motor and the pump, respectively, are secured, being attached at either end of the core and a cylindrical outer wall consisting of a perforated plate being provided on its outer side and attached to the core. In this regard it is advantageous to make the coupling section solely by punching and drawing sheet material, but this involves various structural difficulties. A coupling element consisting exclusively of punched and drawn sheet parts cannot be built up from a core and a shell of relatively thin, perforated plate, since such a structure cannot provide the necessary strength. To obtain this with the use of relatively thin sheet material it is necessary to have a shell of the largest possible diameter, and this material cannot form the filtering surface, since the perforations would reduce the strength essentially.

These difficulties are overcome by the structure according to the present invention which is concerned with a coupling element with a filter casing of the aforesaid kind, consisting of two end walls formed of punched sheet material and shell elements formed of punched sheet material, the said shell elements being welded to the end walls to form a cylindrical outer wall for the coupling element. Water flow openings are provided in the coupling element and a cup-shaped filter body is arranged within the coupling element at a substantial distance from the outer wall of the coupling element.

SUMMARY OF THE INVENTION

The said coupling element is primarily characterized by a method of manufacture not previously proposed, but an additional characteristic of the coupling element proper is that the filter means consists of a special body mounted inside the coupling element, whereas the portion giving the necessary strength is formed by an outer shell. It is thereby possible to form a relatively light and adequately strong coupling element from parts which are all punched and formed by drawing relatively thin sheet material and assembled by welding.

Figure 1:
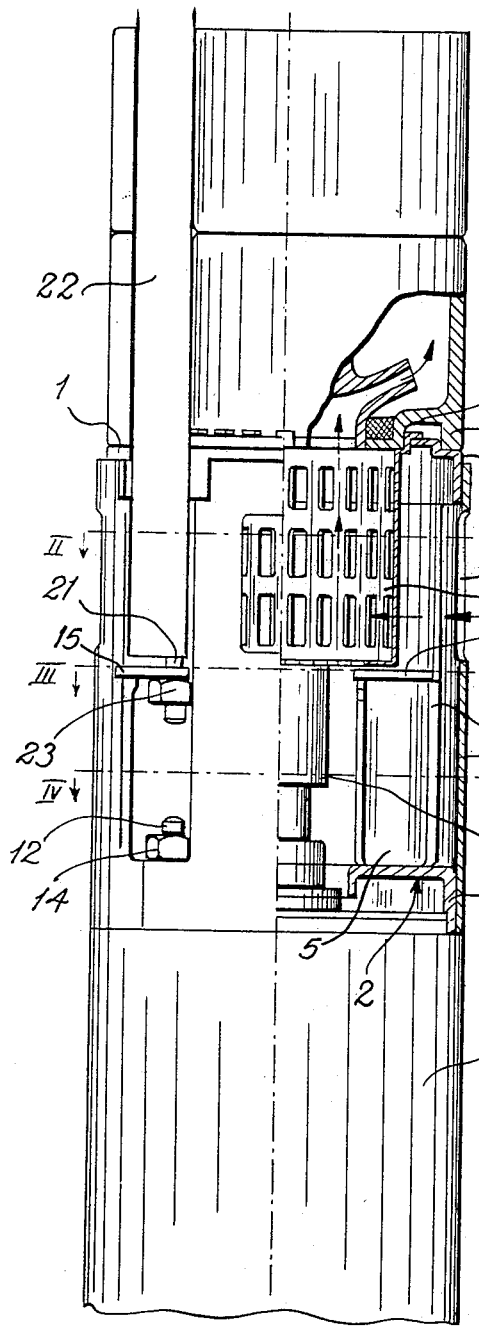
Figure 2:
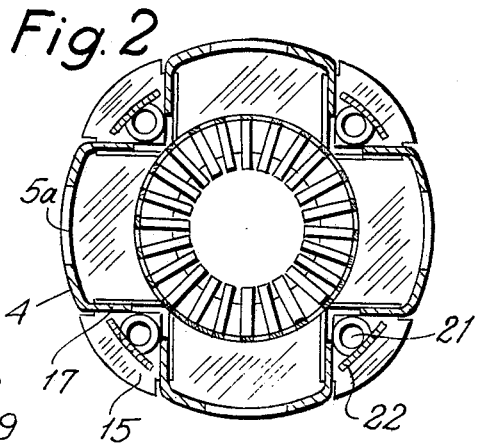
Figure 3:
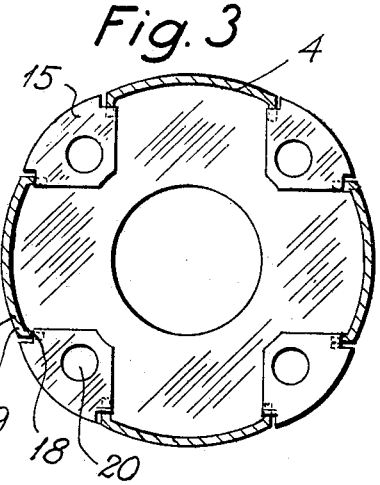
Figure 4:
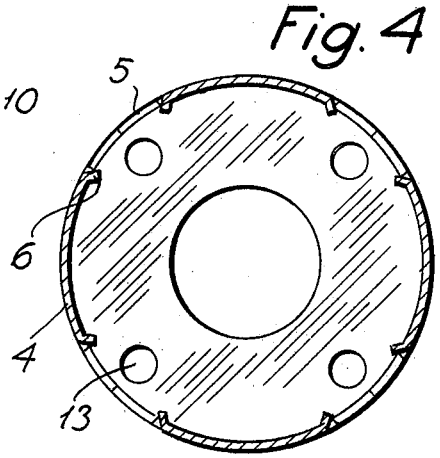

In the drawing:
FIGURE 1 shows a part of a submerged pump piping with the coupling element viewed from the side, partly in section,
FIGURE 2 is a section taken on the line II—II of FIGURE 1,
FIGURE 3 is a section taken on the line III—III of FIGURE 1, and
FIGURE 4 a section taken on the line IV—IV of FIGURE 1.

The coupling element according to the invention consists of two end walls, that is, an upper end wall 1 and a lower end wall 2. The said end walls are formed of sheet material by drawing and each has a flat portion and a tubular flange 3 to which there are attached four shell elements 4 by welding. Each of these shell elements is formed as a part of a cylindrical surface, and as will appear from FIGURE 4 the shell elements 4 are spaced at such distance apart as to provide four openings 5 through which water may flow into the coupling element. The vertical edges of the shell elements have an inwardly extending bend 6 serving to make the outer surface smooth.

At a higher level of the shells are provided with openings 5a (FIGURE 2) which also permit the inflow of water.

Inside the cylindrical outer wall formed by the four shell elements, the coupling element is provided with a bowl-shaped filter body 7 also formed by drawing sheet material. At its upper end the said body 7 has parts 8 lying on top of the flat portion of the end wall 1. The parts 8 are fastened between the end wall 3 and the pump casing 9, which is above the coupling element, by means of assembly means which will be described in the following. The water passes through the openings 5, 5a in elements 4 into the coupling element and then the water flows through filter body 7 to the pump as shown by the arrows in FIG. 1.

Below the coupling element is an electro-motor 10 which drives the pump through a coupling 11 and the motor 10 is fastened to the coupling element by means of screws 12. The said screws are passed through holes 13 in the flat portion of the end wall 2, nuts 14 of the bolts being tightened against the upper side of the said flat portion.

Directly below the lower end wall of the filter body 7 are four segment-shaped contact plates 15 which are supported on their underside by inwardly bent flanges 16 provided on the shell elements 4 and bounding openings 5a, and the plates are prevented from moving upwards by bent flanges 17 provided on the upper part of the shell elements 4. As will appear from FIGURE 3, the contact plates 15 are provided at their outer corners with notches 18 for receiving a skived side edge 19 of the element 4. Thus, the contact plates 15 are retained in their position when the shell elements have been secured to the end walls.

Each contact plate 15 is provided with a hole 20 for a bolt 21 which is connected by welding to an assembly band 22 serving to keep the sections of the pump casing 9 assembled and further to join the pump casing to the coupling element, by which also the filter body 7 is fastened. The bolts 21 have nuts 23 which contact the underside of the contact plates 15 and force these upwards against the flanges 17 which have adequate strength to resist the pressure exerted by the assembly. The assembly bands 22 are welded to the outer side of the bolts 21 and extend axially in grooves formed by the flanges 17 (see FIG. 2) between the coupling element and the outer side of the pump casing.

As will appear from FIGURE 1, the spaces 5 between the shell elements 4 provide access to the nuts 14 and 23 so that these may be tightened by means of suitable tools.

When the coupling element is manufactured, the assembly plates 15 are brought into position between the shell elements 4 before these are attached to the flanges 3 of the end walls by spot welding or resistance seam welding.

I claim:

1. A coupling element for connection between a centrifugal pump and a driving motor therefor, said coupling element comprising two axially spaced end walls, the motor being secured to one of said end walls, a plurality of shell elements secured to said end walls to define a cylindrical shape for the coupling element, said elements defining inlet openings for the passage of a fluid into the coupling element, a filter casing supported within the coupling element and communicating with the pump through the other of said end walls such that fluid entering the coupling element passes through the filter casing into the pump, a plurality of tension means, equal in number to the number of shell elements, extending axially of the coupling element to secure the pump and the coupling element together, said shell elements having ends with inwardly directed flanges extending along a portion of the length of said elements to define axial grooves, and contact plates engaging adjacent shell elements beneath said grooves and in contact with the inwardly directed flanges at the edges thereof, each said tension means extending in a respective groove and engaging said contact plates to hold the same against said edges of the flanges.

2. A coupling element as claimed in claim 1 wherein said inlet openings are formed between adjacent shell elements in alignment with said grooves.

3. A coupling element as claimed in claim 1 wherein said contact plates are constituted as circular segments with notches to receive the ends of the shell elements which bound said inlet openings.

4. A coupling element as claimed in claim 1 wherein each said tension means comprises a band secured to said pump and extending in a respective groove, and bolt and nut means attaching each band to a respective contact plate.

References Cited

UNITED STATES PATENTS

| | | |
|---|---|---|
| 2,939,400 | 6/1960 | Maynard. |
| 2,947,259 | 8/1960 | Wright et al. _____ 103—220 |

FOREIGN PATENTS

| | | |
|---|---|---|
| 114,366 | 4/1918 | Great Britain. |

HENRY F. RADUAZO, Primary Examiner

U.S. Cl. X.R.

103—87, 102, 220; 10—416